Patented Sept. 17, 1935

2,014,434

UNITED STATES PATENT OFFICE 2,014,434

AZO DYE AND METHOD FOR ITS PRODUCTION

Richard Frank Goldstein, Sedgley Park, Prestwich, and Francis Eric Milsom, Huddersfield, England, assignors to Imperial Chemical Industries Limited, a corporation of Great Britain No Drawing. Application February 18, 1933, Serial No. 657,462. In Great Britain February 26, 1932

10 Claims. (Cl. 260—79)

This invention relates to new azo dyes and more particularly refers to disazo dyes having the following general formula:

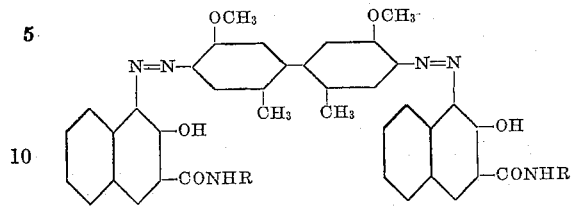

wherein R represents an aryl nucleus which is free from water solubilizing groups.

It is an object of this invention to produce dyes of exceptional brightness and fastness to kier-boiling. A further object is to produce dyes which may be readily and economically imparted to fabrics and which give bright shades particularly Bordeaux. Additional objects will appear hereinafter.

These objects are attained by the process of the present invention wherein 2,2'-dimethyl-5,5'-dimethoxy-benzidine is tetrazotized and coupled with an arylamide of 2,3-hydroxy-naphthoic acid. This coupling component should be free from water solubilizing groups such as carboxyl and sulfonic acid groups, but may have substituted thereon groups such as alkyl, alkoxy and halogen.

The invention may be more completely understood by reference to the following illustrative example:

Example 1.4 grams of 2,2'-dimethyl-5,5'-dimethoxy benzidine were dissolved in 70 ccs. of water and 3 ccs. of hydrochloric acid (36° Tw.). The solution was cooled to 10° C. and tetrazotization was carried out in the usual way. The tetrazo solution was neutralized with chalk, made up to 500 ccs. and a mixture of 25 grams of sodium chloride and 3 grams of magnesium sulfate in 500 ccs. of water was added.

Cotton hanks were immersed in a solution of 2,3-hydroxy-naphthoic anilide, 10 grams per litre, prepared according to the usual technique in the production of insoluble ice colors, for ½ hour at 25–30° C. and then immersed in the diazo solution prepared as above.

A Bordeaux shade was produced, practically unaffected by the usual soaping after treatment, and of very good fastness to severe chlorine and open caustic soda kier-boil and bleach.

When 2,3-hydroxy-naphthoic 4-bromo-o-anisidide was used at a concentration of 4.5 grams per litre, a bright Bordeaux shade was produced, also of very good fastness to severe chlorine and open caustic soda kier-boil and bleach.

It is to be understood that the other arylamides of 2,3-hydroxy-naphthoic acid may be substituted for the coupling component used in the above example. It is preferable to select the aryl nucleus from the benzene or naphthalene series but the invention is not confined thereto. Among the components which fall within this class and which have been found to give excellent results may be mentioned the para-anisidide-, the 5-chloro-ortho-toluidide-, and the naphthylamide of 2,3-hydroxy-naphthoic acid.

The dyes described herein are exceptionally well adapted to dyeing fibers, particularly cellulose fibers, in bright shades of excellent fastness to light, chemick, and kier-boiling. They are readily produced and easily applied and form a valuable addition to the ice colors now known.

As many apparently widely different embodiments of this invention may be made without departing from the spirit and scope thereof, it is to be understood that we do not limit ourselves to the specific embodiments thereof except as defined in the appended claims.

We claim:

1. A process for producing azo dyes which comprises coupling tetrazotized 2,2'-dimethyl-5,5'-dimethoxy-benzidine with an arylamide of 2,3-hydroxy-naphthoic acid which is free from water solubilizing groups.

2. A process for producing azo dyes which comprises coupling tetrazotized 2,2'-dimethyl-5,5'-dimethoxy-benzidine with a compound having the following general formula:

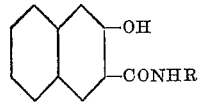

wherein R represents an aryl nucleus of the benzene or naphthalene series which is free from water-solubilizing groups.

3. A process for producing azo dyes which comprises coupling tetrazotized 2,2'-dimethyl-5,5'-dimethoxy-benzidine with an anilide of 2,3-hydroxy-naphthoic acid, wherein the anilide nucleus is free from water-solubilizing groups.

4. A process for producing azo dyes which comprises coupling tetrazotized 2,2'-dimethyl-5,5'-dimethoxy-benzidine with a compound having the following general formula:

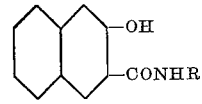

wherein R represents an aryl nucleus of the alkyl-benzene, alkoxy-benzene or halogeno-benzene series which is free from water-solubilizing groups.

5. A process for producing azo dyes which comprises coupling tetrazotized 2,2'-dimethyl-5,5'-dimethoxy-benzidine with the anilide of 2,3-hydroxy-naphthoic acid.

6. Azo dyes having the following general formula:

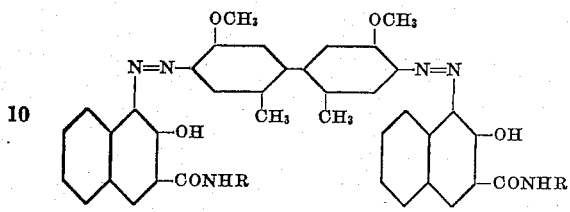

wherein R represents an aryl nucleus which is free from water solubilizing groups.

7. Azo dyes having the following general formula:

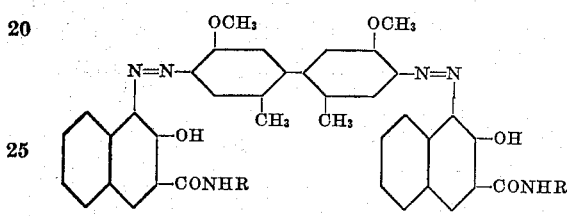

wherein R represents an aryl nucleus of the benzene or naphthalene series which is free from water-solubilizing groups.

8. Azo dyes having the following general formula:

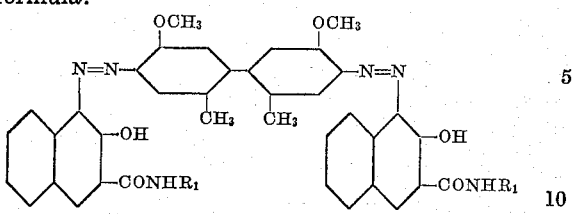

wherein $R_1$ represents an aryl nucleus of the benzene series which is free from water-solubilizing groups.

9. Azo dyes having the following general formula:

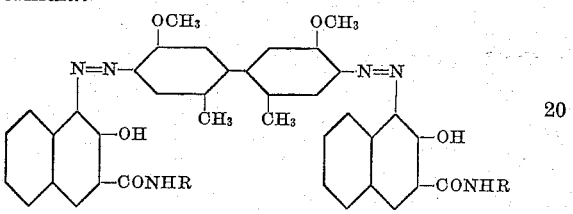

wherein R represents an aryl nucleus of the alkyl-benzene, alkoxy-benzene or halogeno-benzene series which is free from water-solubilizing groups.

10. An azo dye having the following formula:

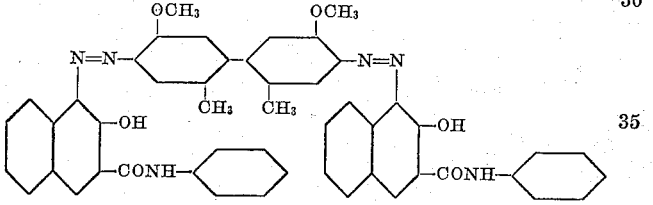

RICHARD FRANK GOLDSTEIN.
FRANCIS ERIC MILSOM.